March 24, 1953     N. T. MOSCA     2,632,255
CENTERING GAUGE
Filed Jan. 29, 1951     2 SHEETS—SHEET 1
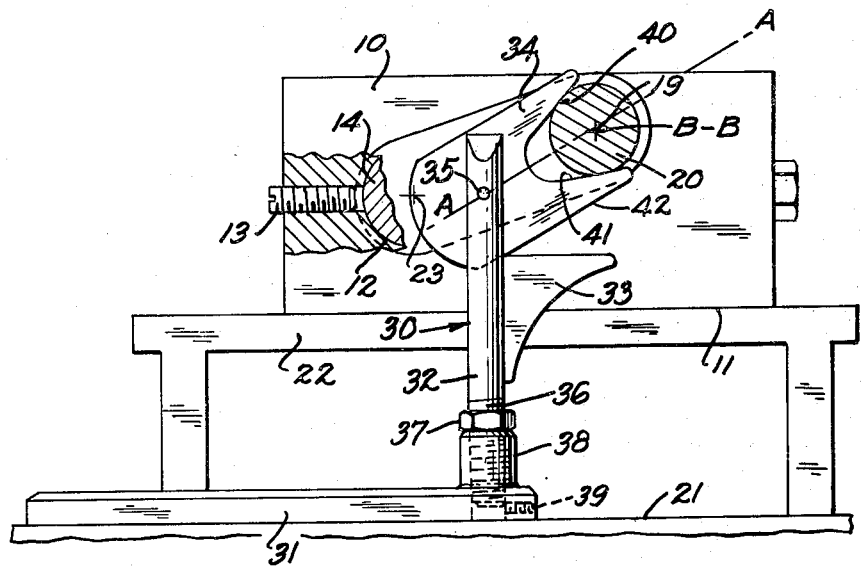
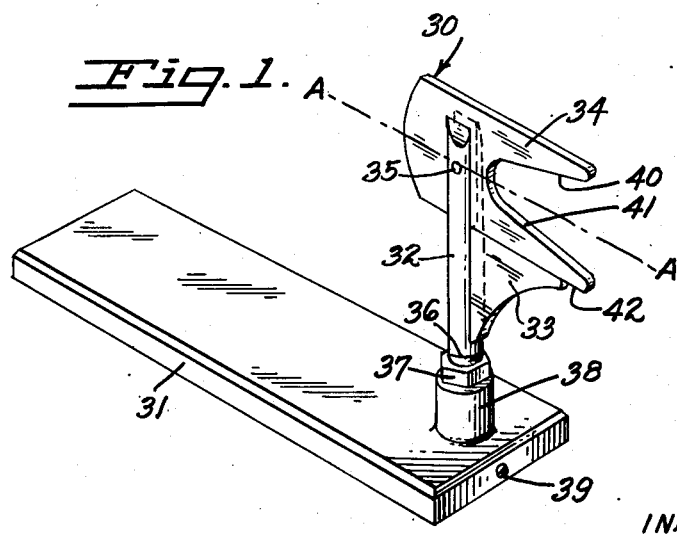
INVENTOR
NESTOR T. MOSCA
BY
ATTORNEY March 24, 1953 — N. T. MOSCA — 2,632,255
CENTERING GAUGE Filed Jan. 29, 1951 — 2 SHEETS—SHEET 2

INVENTOR
NESTOR T. MOSCA
BY
ATTORNEY

Patented Mar. 24, 1953

2,632,255

UNITED STATES PATENT OFFICE 2,632,255

CENTERING GAUGE

Nestor T. Mosca, Oakland, Calif.

Application January 29, 1951, Serial No. 208,267

1 Claim. (Cl. 33—180)

This invention relates to a tool useful in positioning a crankshaft in a jig preparatory to grinding the cylindrical surface of each of the crankpin bearings.

More particularly, it relates to a height gauge for use in positioning the axis of a particular crankpin (to be reground) in relation to the main bearings of the crankshaft, as well as in relation to a bearing in the jig which will hold the crankshaft during the grinding of the crankpin. The jig holds the crankshaft by its end main bearings while it rotates the crankshaft about the axis of the crankpin. Each jig has a bearing to receive a lathe center and the important job in setting up to grind the surface of a crankpin bearing is to have the jig bearing line up with the center or axis of the crankpin bearing. Until the development of this invention a machinist wasted much time with the old cut and try methods.

The object of the present invention is to aid in aligning the exact center of each crankpin with the bearing on each jig, and to do so as quickly as possible. It accomplishes this object by locating an approximate center so close to the exact crankpin bearing center that only minor adjustments, if any, are then needed to complete the alignment.

An illustrative gauge embodying the principles of the invention will now be described in detail, in accordance with U. S. Revised Statutes, section 4888. However, it should be understood that the drawings and description are illustrative only and are not to narrowly limit the invention, which is defined in the appended claim.

In the drawings:

Fig. 1 is an isometric view of a gauge embodying the principles of the invention.

Fig. 4 is a view similar to Fig. 3 with the gauge jaws pivoted upwardly. This illustrates the initial position of the gauge when it first engages its crankpin, before the shaft is rotated to move the crankpin to the desired height.

Figure 2:
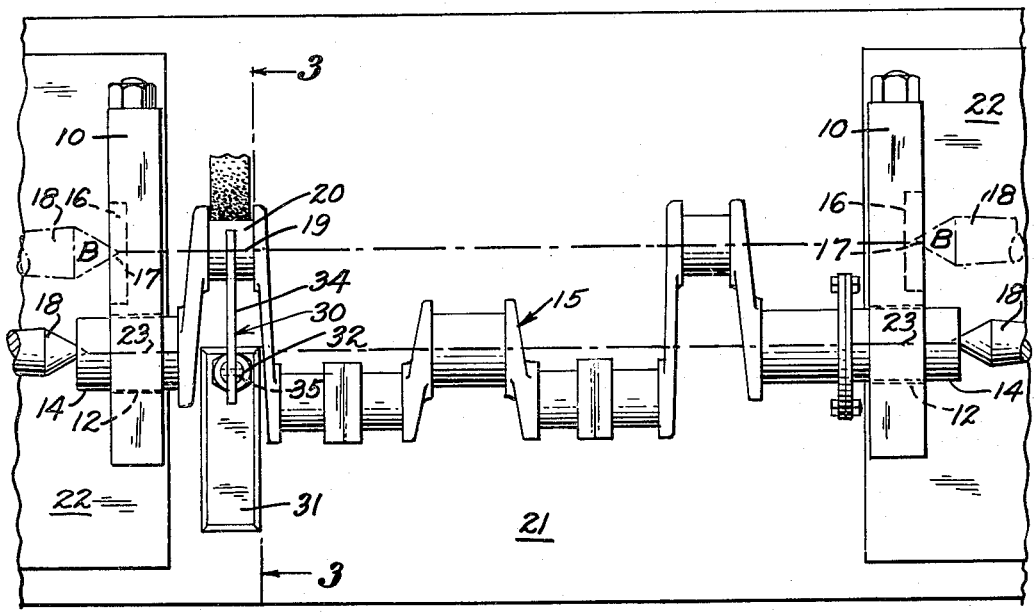
Fig. 2 is a top plan view of the gauge of Fig. 1 shown in connection with a crankshaft to be reground and the jigs that support the crankshaft during the regrinding operation.

What happens in the use of an engine is that friction and abrasion will cause the crankshaft main bearings and crankpin bearings to wear. When wear makes a bearing out of round, the female bearing part in which it runs will not be in close 360° contact; so the bearing load will be unduly concentrated on the areas still in contact. During an engine overhaul all these conditions should be corrected and what the present invention comprises is a gauge to aid the machinist in setting up the crankshaft in a crankshaft grinding tool so these cylindrical bearing surfaces can be made round again. In regrinding these bearings it is preferable to take off as little metal as possible.

There is no particular problem in setting up to grind the surface of the main crankshaft bearings for the crankshaft has the centers in each end in which the crankshaft was swung in the lathe when originally made. The centers (where existent) originally used in turning and grinding the surfaces of the crankpin bearings are not useful in regrinding these surfaces for several several reasons, one being that in use the crank arms have most likely changed position enough so that the several crankpin bearings that originally were in axial alignment are no longer in such alignment. Another is that the crankpin bearings may not have worn to the same extent or the same shape. This means that the machinist, to do a good job, must position one crankpin bearing, grind it and then position the next crankpin bearing, grind it and so on for each crankpin bearing.

It is an awkward job to hold a crankshaft when grinding the surface of the crankpin bearings and jigs have been devised which can be secured tightly to the opposite end main bearings on the crankshaft. Each jig has a movable bearing block, adapted to receive a lathe center, and about which the jigs and crankshaft can be rotated while grinding the surface of a crankpin bearing. My present invention is important as an aid in positioning the center of the crankpin bearing in exact axial alignment with the bearing in the movable bearing block in the jig. One great advantage of my invention is that it enables the machinist to find the center of the crankpin bearing almost immediately, whereas in the past a machinist has had to adjust, try, readjust, try, and so on for minutes before he obtained the desired center alignment.

In my co-pending application, Serial No. 751,039, issued June 10, 1952, as Patent 2,599,931, is shown a preferred form of jig and one with which the present invention can be used. Briefly, this jig includes a block 10 having a flat side face 11, a hole 12 to receive, and a set screw 13 to hold, the main bearing 14 of the crankshaft 15. A movable bearing block 16 is mounted in the jig block 10. It can be moved in relation to the hole 12 with micrometer-like accuracy and has in it a female bearing 17 to receive a lathe center 18. One is used on each end of the crankshaft 15. The machinist's job is to secure each jig by the set screw 13 to one of the end main bearings 14 of the crankshaft 15 when the center 19 of the crankpin bearing 20 is in alignment with the center-receiving bearing 17 on the movable bearing block 16.

He does this on a flat table or lathe bed 21, on which he has two low tables, 22, one to support each jig on its side. The distance X plus Y in Fig. 3 equals the distance between the table 21 and the centers 18 of the crankshaft grinding machine.

The steps he follows in grinding the crankpin bearings 20 are these: A jig 10 is placed on each end main bearing of the crankshaft 15. Each jig 10 is turned on its side 11 on the table 22, then the lathe centers 18 are moved into the bearings in the ends of the crankshaft 15.

Next the machinist sets the distance between the center 23 of the crankshaft main bearing 14 and the female bearing 17 in the movable jig block 10 at the known distance of the throw of crankshaft. This distance is also the distance between the center 23 of the crankshaft main bearing 14 and the center 19 of the crankpin bearing 20. The machinist may have done this setting of the movable blocks 16 on the jigs before he puts the jigs on the ends of the crankshaft.

Since the set screws 13 are still loose, the crankshaft 15 can be rotated on the centers 18, and the remaining job for the machinist is to line up the center of the crankpin bearing 20 with the bearing 17 in the jig block 10.

Prior to the present invention this was done by placing a height gauge on the flat table 21 and rotating the crankshaft 15 about the axis 23 of the main bearings 14 until the desired crankpin 20 rested on top of the height gauge. This gauge was of a height from the flat table 21 equal to X plus Y minus one-half the diameter of the crankpin bearing. Then the machinist tightened the set screws 13 in the two jigs. The main trouble with this method was that it gauged from a point on the circumference of the crankpin bearing 20 rather than in relation to the axis or center of the bearing. Not all crankpin bearings are originally ground to the same diameter, and crankpin bearings wear unevenly, so that use of a gauge which gauged only from a single point on the bearing surface was inefficient. The machinist had to measure the diameter first and then set the height gauge. In most cases the gauges used were not adjustable, so in practice the machinist would tap the shaft with a hammer to move it back and forth in the jig until he got an alignment which satisfied him. Not only did this waste time, but it also resulted in inaccuracies in grinding that later would cause the shaft to wear more rapidly.

This brings me to the point where I can now describe the invention of the present application. It concerns a gauge 30 to be used by the mechanic in gauging the height of the crankpin bearing 20 above the flat table 21. The structure of the gauge 30 will be described before its operation is described.

As shown in Fig. 1, the gauge 30 preferably comprises a base 31 (adapted to rest on the table 21), a standard 32 supported vertically therein, a stop member 33 rigidly secured to the standard 32, and a jaw member 34 pivotally secured to the standard 32 by the pivot shaft 35 and adapted when at the lower limit of its swing to rest on top of the stop member 33. In this position the line A—A which bisects the angle made by the jaw will be horizontal and parallel with the table 21. Any other form of stop for the jaw member may be used.

If the pivot 35 is not in line with a line A—A bisecting the angle between the jaws, as it need not be, then the line A—A is the one to keep in line with the lathe center height X plus Y in positioning the crankpin.

The base member 31 is made sufficiently heavy to prevent the device from toppling. It is preferably made with a planar lower surface that can be moved easily on the lathe bed 21.

Figure 3:
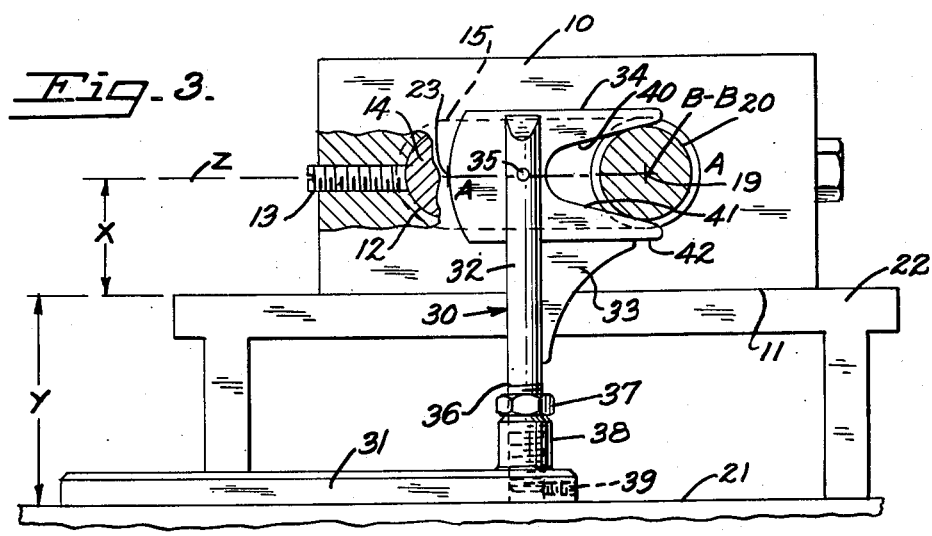
Fig. 3 is a view in section taken along the line 3—3 in Fig. 2.

As shown in Fig. 3, the standard 32 has its lower end 36 threaded, with a lock nut 37. This engages in a threaded socket 38 which has a set screw 39 to hold the standard 32 against rotation when the correct height adjustment is obtained. This correct height is secured by aligning the center of the pivot shaft 35 with the center 23 of the crankshaft main bearing 14 and with the center 18 of the lathe. In other words, the distance of the center of the shaft 35 from the bottom of the support 31 is X plus Y.

The jaw member 34 has two converging interior jaw faces 40 and 41. The included angle is preferably about 30°, but may be greater or smaller. The angle should be acute enough to contact two rather widely spaced points on the circumference of the crankpin bearing when the latter is inserted in the jaw. If the angle is too large, there will not be sufficient arc distance between its contact points on the bearing, and the measurement may not be as accurate. If the angle is too small, the jaws will have to be too long. The whole purpose of the jaw member is to get gauging contact on the crankpin bearing at two points, spaced apart and on opposite sides of the dotted line Z in Fig. 3. This is in contrast with the single contact of the prior art gauge on the under side of the bearing.

*Operation*

Having in mind that the thing the machinist is trying to accomplish in as short a time as possible is to align the center 19 of the crankpin bearing 20 with the center of the bearing point 17 in the jig (which in the steps previously described was brought into horizontal alignment with the center 23 of the main bearing 14 of the crankshaft 15), he will slide the gauge base 31 on the lathe table 21 to bring the jaw member 34 into two-point contact with the crankpin bearing 20 about as shown in Fig. 4. At this time the set screws 13 on the jigs are loose. With one hand he will rotate the crank shaft 15 (clockwise in Fig. 4) and with the other hand he will move the gauge base 31 to keep the jaw edges 40 and 41 in contact with the bearing surface of the crankpin 20. When the lower edge 42 of the gauge jaw 34 comes to rest on the stop member 33, this will stop rotation of the crankshaft 15 and will be an indication to the machinist that the center 19 of the crankpin bearing 20 lies one-half above and one-half below the line Z (Fig. 3). This will assure substantial alignment of the center 19 of the beairng 20 with the center bearing 17 on the movable member 16 in the jig. Then the machinist tightens the set screws 13 to hold the crankpin bearing 20 in this fixed position.

The next step is to move the jigs and the crankshaft 15 horizontally so the lathe centers 18 can be transferred from the center of the main crankshaft bearings 14 to the center bearings 17 in the movable member 16 in the jigs. To effect this the machinist backs out the lathe centers 18, slides the jigs 10 on the tables 22 and runs the lathe centers 18 into the bearings 17 on the jigs.

The alignment of the center 19 of the crankpin bearing 20 and the jig bearings 17 may now be checked by rotating the shaft about the axis B—B. A height fluctuation gauge (not shown) of any well-known type will show any fluctuation in height of the bearing surface on the crankpin 20. The movable bearing blocks 16 in the jig may be adjusted to compensate for any small error that may remain.

The machinist is now ready to bring the grinding wheel up into surface contact with the crankpin bearing 20 to resurface the bearing. The crank shaft 15 and the jigs 10 holding it are rotated at the same time about the centers B—B.

I claim:

A gauge for locating a crank pin or the like, comprising a horizontal base member having a plane bottom supporting surface, a vertical standard having its lower end adjustably connected to said base member, a medial slot in said standard extending downwardly from its upper end, a plate-like stop member rigidly connected to said standard below said slot and having a straight upper edge, a jaw member including a flat body portion disposed within said slot and pivotally connected to said standard, said jaw member having a straight edge engageable with said stop member straight edge in crankpin locating position thereof, said jaw member including a pair of jaws having outwardly diverging adjacent edges engageable with said crank pin, said stop member being so correlated that when said jaw member engages said stop member, a line bisecting the angle between said diverging edges of the jaws will be parallel with said bottom supporting surface of the base.

NESTOR T. MOSCA.

REFERENCES CITED

The following references are of record in the file of this patent:

UNITED STATES PATENTS

| Number | Name | Date |
|---|---|---|
| 1,447,346 | Gilman | Mar. 6, 1923 |
| 2,468,395 | Fredin | Apr. 26, 1949 |

OTHER REFERENCES

Pub.: "Motor Age." May 29, 1924, page 16.